UNITED STATES PATENT OFFICE.

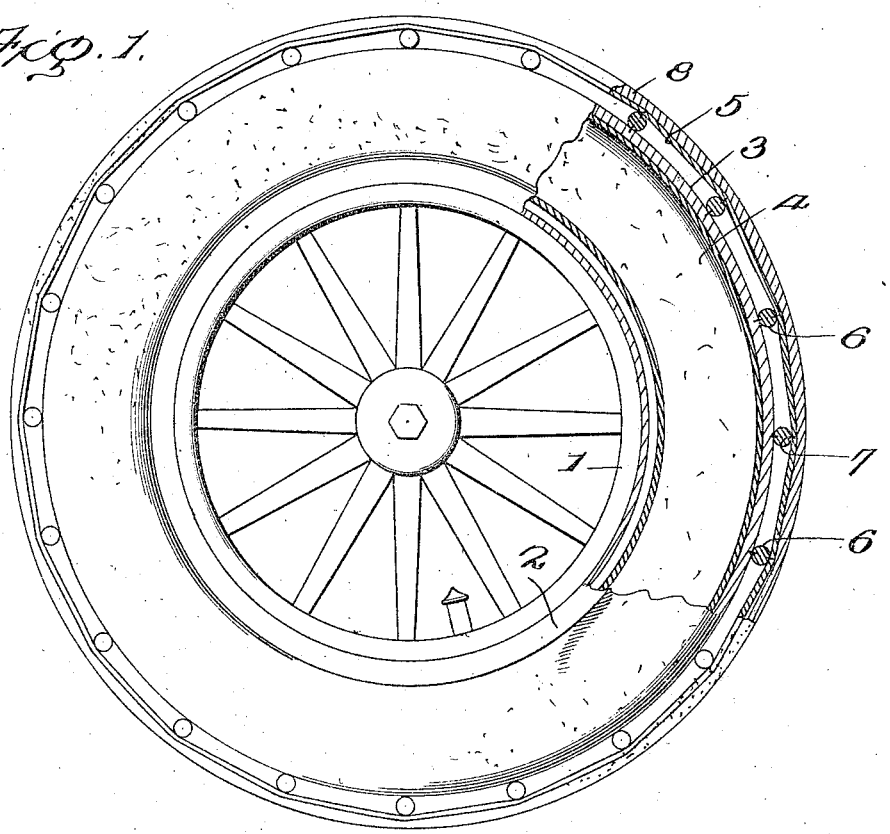
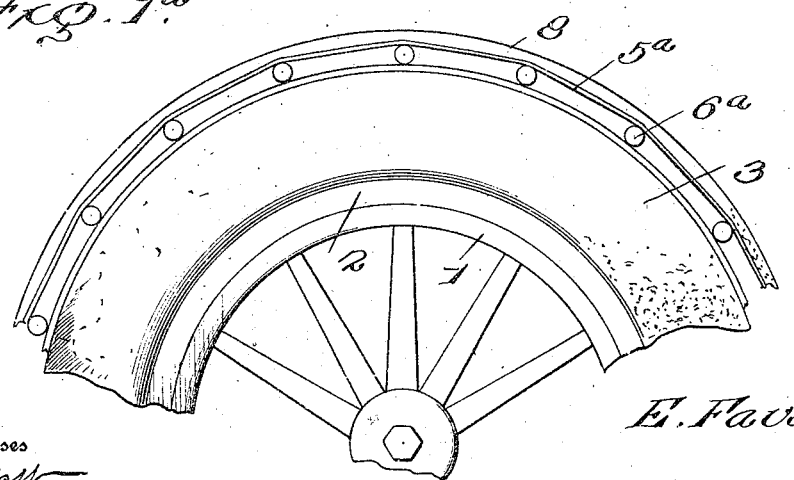

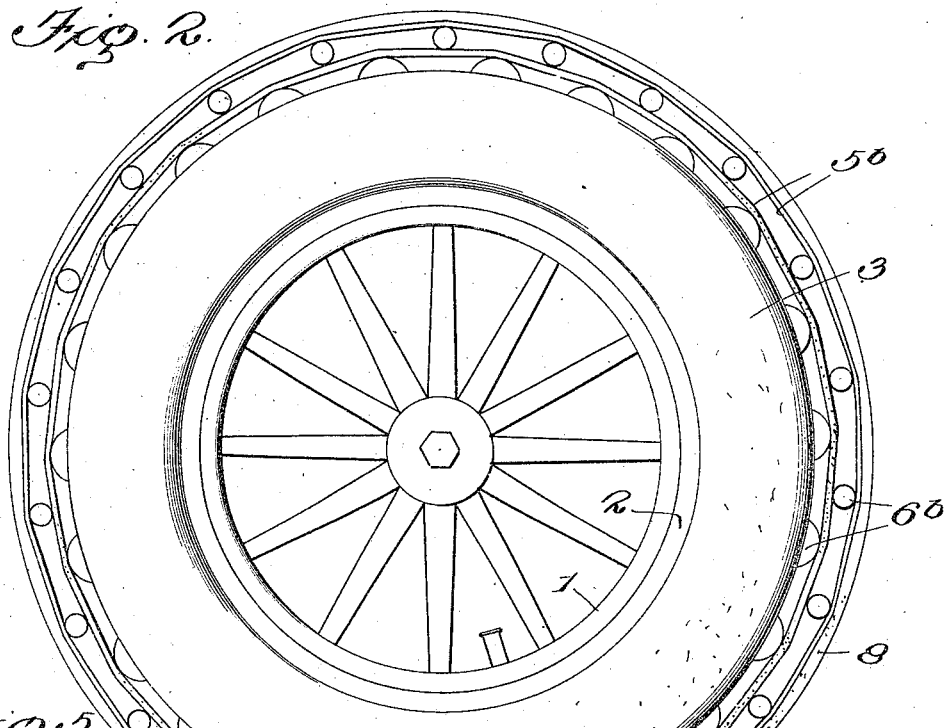
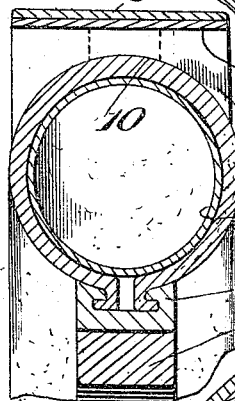
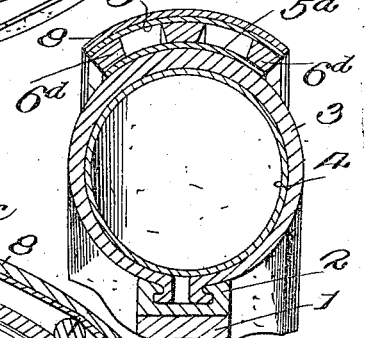
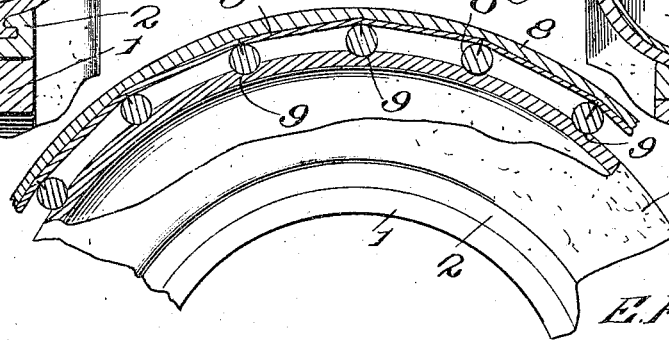

ETHELBERT FAVARY, OF EAST BOSTON, MASSACHUSETTS.

TIRE.

1,136,662.  Specification of Letters Patent.  Patented Apr. 20, 1915.

Application filed July 6, 1909. Serial No. 506,153.

*To all whom it may concern:*

Be it known that I, ETHELBERT FAVARY, citizen of Hungary, residing at East Boston, in the county of Suffolk and State of Massachusetts, have invented certain new and useful Improvements in Tires, of which the following is a specification.

The invention relates to vehicle tires and comprehends certain new and useful improvements in such tires, with the object in view of providing a tire structure which will readily accommodate itself to the inequalities of the roadway, and at the same time avoid the annoyances arising from the puncture of the air chamber when this is used, lessen the amount of rubber and fabric required in the construction of the air chamber, and avoid the wear upon the walls of the air chamber ordinarily occasioned by their contact with the road surface.

Having these objects in view, my invention consists in providing an accommodating structure of pliable bands and suitable supports mounted upon an air chamber, and brought into a condition of tension suitable to support the intended load by the pressure of air maintained within the air chamber, together with other details of construction particularly described hereinafter and set forth in the appended claims.

In connection with the following description of the invention, reference is to be had to the accompanying drawings, which illustrate tires in which the spirit of the invention is embodied, it being understood that the invention is not limited to the form shown, but rather that the illustrations are intended to indicate diagrammatically the physical application of the manner in which the principles involved are applied, in accordance with the description.

In the drawings, Figure 1 represents a side elevation of a vehicle wheel equipped with an embodiment of my invention consisting of a pneumatic tire which supports and tensions a single pliable tread-carrying band; Fig. 1ª represents a like view of a portion of the wheel equipped with a tire involving a slight modification of the structure illustrated in Fig. 1; Fig. 2 represents a side elevation of a wheel equipped with my preferred form of tire, which embodies two pliable bands supported and tensioned by an inflated pneumatic tire in such manner that the structure as a whole has a large capacity for accommodating itself to the inequalities of the roadway, together with a high degree of resilience, while the walls of the air chamber are never subjected to contact with the surface of the roadway; Fig. 3 is a fragmentary sectional view of a portion of the wheel rim equipped with another modification of the tire structure comprising the invention, wherein the supports for the tensioned band are seated in depressions provided in the peripheral wall of the air chamber; and Figs. 4 and 5 are cross sectional views showing two variations of the transverse structure of the tire as it may be constructed in accordance with this invention.

The term "pliable" as applied to the tensioned bands forming the tread-carrying structure of my tire is used to define a flexible material which will readily adapt itself to the shape of an obstruction with which it is brought in contact, in contradistinction to a material which is relatively stiff and offers any considerable resistance to deformation. The form taken by the bands within the tread-carrying structure of my tire will therefore be seen to be due to the tension exerted upon the bands, and not to the tendency of the band to naturally assume this form.

Reference to the drawings, and particularly to Fig. 1, shows the character 1 to designate a felly of a wheel, which, with the spokes and hub, may be of the usual construction employed upon vehicles of the class upon which resilient tires are used, and 2 designates the rim which usually surrounds the felly, such as the channeled rim ordinarily employed with pneumatic and cushion tires of the clencher type. 3 designates the outer casing or shoe which may be secured to the rim in any desired way, such, for instance, as by the beads employed with the clencher type; and 4 designates an inner tube of the usual type. Combined with these already known devices, my invention comprises a plurality of relatively rigid supports 6, which rest upon the peripheral wall of the pneumatic tire 3, and support a substantially inelastic band 5 upon the outer surface of which a tread of rubber or other suitable substance is secured. The band 5 is preferably made of strong woven fabric in which a straight longitudinal warp is employed, but this band may be composed of rubber and canvas, vulcanized fabric, leather, thin steel, wires, wire ropes or cables, twine, chains, etc., so long as the pliable characteristic before mentioned is retained, and the material is capable of withstanding the tension required to support the intended load. The supports 6 are preferably made of metal, either solid or hollow, or of some other rigid substance, though a material may be employed which is not actually rigid, but is stiff enough to sustain the band when tension is brought upon it, such, for instance, as some of the harder compositions of rubber. The supports 6 are preferably positively connected by staples or rivets 7 or the like to both the peripheral wall of the air chamber and to the tension band, though in Fig. 3, I have shown a structure wherein the supports $6^c$, though being positively connected to the band 5 by rivets or staples, are seated to the depressions 9, molded in the peripheral wall of the air chamber. While this seating of the supports in depressions in the wall of the air chamber will prevent creep of the tread structure, I prefer to positively attach the supports to both the wall of the air chamber and the band.

It may be advantageous to secure the supports to the tensioned band and to a base band and then attach the base band to the peripheral wall of the air chamber by cementation or vulcanization. I have shown such a structure in Fig. $1^a$, and it would appear that this arrangement would be of advantage in combining my tread structure with a pneumatic tire of the usual type to provide my new tire structure.

It is to be understood that any suitable outer cover may be employed so that the entire arrangement may be inclosed if desired. But I have omitted any showing of such outer cover, as it, in itself, forms no part of my present invention.

Instead of employing one pliable band and one series of supports, I prefer to employ two or more pliable bands as illustrated in Fig. 2, and a plurality of supports, designated $6^b$, one set of supports being placed in staggered relation to the supports in the other set. In this embodiment of the invention, the supports for the outer band $5^b$, should be positively connected in the manner hereinbefore described, to both of the tensioned bands, and the supports for the inner band should be positively connected to that band, and preferably have a positive connection to the peripheral wall of the air chamber.

In Fig. 2, the supports $6^b$, for the inner tensioned bands may be projections from the wall of the air chamber, though it is desirable that these supports be of comparatively hard rubber, if such a structure is to be employed, as they would be crushed by the pressure required to tension the bands, if too soft.

I deem it most preferable to employ rigid supports for both bands.

In Figs. 4 and 5, the tread surface of the tire is respectively shown as curved and straight, in cross section. Either form may be employed, and the supports $6^d$ and $6^e$ shaped to correspond.

The tread structure comprising the tensioned band and its support, or the plurality of bands and their supports, should, of course, have an inner diameter of somewhat less than the maximum diameter of the air chamber, in order that the inflation of the air chamber may put the bands under sufficient tension to resist the load and prevent the collapse of the tread structure and the consequent contact of the air chamber walls with the surface of the roadway.

In each of the embodiments of my invention, it is to be understood that every two adjacent supports hold under tension that portion of the encircling band or bands that lies between them, so that when any portion of the wheel receives an inward stress or impact, such portion of the band will yield, to draw all of the outlying portion of the band toward the point of dip or inward movement, the stress being thereby distributed and the resiliency materially increased.

From the foregoing description, in connection with the accompanying drawings, it will be evident that the wear and tear on the ordinary pneumatic tire is not present in my tire, owing to the fact that the air chamber is never exposed to the abrasive action of the surface of the roadway, and therefore it follows that economies are effected in the amount of rubber and canvas required in the structure of the pneumatic tire employed in my combination.

What I claim is;

1. A vehicle tire comprising an annular air chamber, relatively rigid supports mounted upon the peripheral wall of said air chamber and a pliable band tread supported upon and connected with said supports, to be brought into a state of tension by the inflation of said air chamber, substantially as described.

2. A vehicle tire comprising an annular air chamber, relatively rigid supports mounted upon and connected with the peripheral wall of said air chamber and a pliable band tread supported upon and connected with said supports, to be brought into a state of tension by the inflation of said air chamber, substantially as described.

3. A vehicle tire comprising an annular air chamber, a series of relatively rigid supports mounted upon the peripheral wall of said air chamber, a pliable band supported upon and connected with said supports, a second series of relatively rigid supports mounted upon and connected with the between-support stretches of said pliable band, and a pliable tread band mounted upon and connected to said second series of supports, said bands being subjected to tension by the inflation of said air chamber, substantially as described.

In testimony whereof I affix my signature in presence of two witnesses.

ETHELBERT FAVARY. [L. S.]

Witnesses:
H. W. PHILLIPS,
JOHN T. HABERLIN.